US009141401B2

(12) United States Patent
Li et al.

(10) Patent No.: US 9,141,401 B2
(45) Date of Patent: Sep. 22, 2015

(54) METHOD FOR SWITCHING SYSTEM STATE AND PORTABLE TERMINAL

(75) Inventors: Bin Li, Beijing (CN); Hao Chen, Beijing (CN); Qian Zhao, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 238 days.

(21) Appl. No.: 13/515,778

(22) PCT Filed: Dec. 13, 2010

(86) PCT No.: PCT/CN2010/002028
§ 371 (c)(1),
(2), (4) Date: Jun. 13, 2012

(87) PCT Pub. No.: WO2011/072480
PCT Pub. Date: Jun. 23, 2011

(65) Prior Publication Data
US 2012/0260084 A1 Oct. 11, 2012

(30) Foreign Application Priority Data
Dec. 18, 2009 (CN) .......................... 2009 1 0242880

(51) Int. Cl.
*G06F 1/32* (2006.01)
*G06F 9/00* (2006.01)
*G06F 9/24* (2006.01)
*G06F 15/177* (2006.01)
*G06F 13/00* (2006.01)
(Continued)

(52) U.S. Cl.
CPC .............. *G06F 9/4418* (2013.01); *G06F 9/441* (2013.01); *G06F 9/461* (2013.01); *G06F 11/2028* (2013.01); *G06F 11/2038* (2013.01); *G06F 11/2097* (2013.01); *H04W 52/028* (2013.01); *G06F 1/32* (2013.01); *G06F 1/3287* (2013.01);
(Continued)

(58) Field of Classification Search
CPC ....... G06F 9/441; G06F 9/4418; G06F 9/461; G06F 1/3287; G06F 1/32
USPC ........................... 713/1, 2, 100, 323; 719/319
See application file for complete search history.

(56) References Cited

U.S. PATENT DOCUMENTS

2001/0016879 A1* 8/2001 Sekiguchi et al. ............ 709/319
2006/0010314 A1* 1/2006 Xu .................................... 713/2
(Continued)

FOREIGN PATENT DOCUMENTS

CN 1797332 A 7/2006
WO WO 2006/066473 A1 6/2006

*Primary Examiner* — Ji H Bae
(74) *Attorney, Agent, or Firm* — Patterson Thuente Pedersen, P.A.

(57) ABSTRACT

A method for switching system state and a portable terminal. The method is applied to a portable terminal comprising a first system and a second system. The second system has a second control module provided therein. The method comprises: obtaining, by the second system, state information of the first system through the second control module when at least one of the first system and the second system is in an inactive state; receiving, by the second control module, a system state switching event; switching, by the second control module, the second system to a state corresponding to the state information of the first system based on the state information of the first system. According to the embodiments of the present invention, when the system state is to be switched, it is not necessary that both systems are in the active state. Rather, the state information can be transmitted between the systems in the inactive state by using a control module provided in one or both of the systems, and the power consumption of the portable terminal can be reduced.

20 Claims, 6 Drawing Sheets (51) Int. Cl.
*G06F 9/44* (2006.01)
*G06F 9/46* (2006.01)
*H04W 52/02* (2009.01)
*G06F 11/20* (2006.01)
*H04W 48/16* (2009.01)
*H04W 88/06* (2009.01)

(52) U.S. Cl.
CPC ............... *H04W 48/16* (2013.01); *H04W 88/06* (2013.01); *Y02B 60/186* (2013.01); *Y02B 60/50* (2013.01)

(56) References Cited

U.S. PATENT DOCUMENTS

| | | | |
|---|---|---|---|
| 2007/0055860 A1* | 3/2007 | Wang | 713/2 |
| 2007/0192765 A1* | 8/2007 | Shimogawa et al. | 718/1 |
| 2008/0189538 A1* | 8/2008 | King et al. | 713/1 |
| 2009/0113458 A1* | 4/2009 | Finger et al. | 719/327 |
| 2009/0320048 A1* | 12/2009 | Watt et al. | 719/319 |
| 2011/0107073 A1* | 5/2011 | Dalton et al. | 713/2 |

\* cited by examiner

METHOD FOR SWITCHING SYSTEM STATE AND PORTABLE TERMINAL

RELATED APPLICATIONS

The present application is a National Phase entry of PCT Application No. PCT/CN2010/002028, filed Dec. 13, 2010, which claims priority to Chinese Patent Application No. 200910242880.2, filed on Dec. 18, 2009, the disclosures of which are hereby incorporated herein by reference in their entirety.

TECHNICAL FIELD

The present invention relates to the field of communication technology, and more particularly, to a method for switching system state and a portable terminal.

BACKGROUND

A terminal of hybrid system architecture is, for example, a Personal Computer (PC) in which at least one further system is embedded into a conventional PC having one system. The different systems can function cooperatively to achieve their respective advantages. Currently, a typical PC of hybrid system architecture has a master system (e.g., Vista) and a slave system (e.g., WinCE) integrated therein. The master system and the slave system can share a keyboard, a network adapter, a display device, a memory device, an audio unit and the like. During operation of the PC of such hybrid system architecture, the master system and the slave system can be switched therebetween as required.

In an existing PC of hybrid system architecture, the master system and the slave system each have system state management software which operates when the respective system is active and is configured to record state information of the system. When a state of one of the systems is to be switched, the state management software performs a switching operation by driving respective hardware, such that the state of the current system can be switched based on the recorded state information. However, when both of these systems are inactive, the system state information of the inactive systems cannot be recorded due to the inoperability of its system state management software. Thus, system switching cannot be performed until the inactive systems are both woken up.

SUMMARY

It is an object of embodiments of the present invention to provide a method for switching system state and a portable terminal to address the problem that both systems of the portable terminal of hybrid system architecture have to be woken up for switching system state.

To achieve the above object, the following solutions are provided according to the embodiments of the present invention.

A method for switching system state in a portable terminal is provided, the portable terminal having a first system and a second system, and the second system having a second control module provided therein, the method comprising: obtaining, by the second system, state information of the first system through the second control module, when at least one of the first system and the second system is in an inactive state; receiving, by the second control module, a system state switching event; switching, by the second control module based on the state information of the first system, the second system to a state corresponding to the state information of the first system.

When the first system is switched from an active state to an inactive state, and the second system is in an inactive state, the step of obtaining, by the second system, state information of the first system through the second control module comprises: the second system receiving, through the second control module, the state information of the first system transmitted from a CPU of the first system; or the second control module receiving the state information of the first system transmitted from a first control module of the first system; or the second control module obtaining the state information of the first system from the CPU or the first control module of the first system.

The step of switching, by the second control module based on the state information of the first system, the second system to a state corresponding to the state information of the first system comprises: the second control module determining that the first system is currently in the active state based on the obtained state information of the first system; the second control module determining that the system state switching event corresponds to a switching logic from the inactive state to the active state; and the second control module waking up the second system such that the second system enters the active state and the first system enters the inactive state.

When the first system is switched from an inactive state to an active state and the second system is in an active state, the step of obtaining, by the second system, state information of the first system through the second control module comprises: the second system receiving through the second control module the state information of the first system transmitted from a first control module of the first system; or the second control module obtaining the state information of the first system from the first control module of the first system.

The step of switching, by the second control module based on the state information of the first system, the second system to a state corresponding to the state information of the first system comprises: the second control module determining that the first system is currently in the inactive state based on the obtained state information of the first system; the second control module determining that the system state switching event corresponds to a switching logic from the active state to the inactive state; and the second control module controlling the second system to enter the inactive state and controlling the first system to enter the active state.

The state information comprises state information of a system or state information of an application. The state information of a system comprises sound information, and/or volume information. The state information of an application comprises information on playing progress of multimedia, and/or information on the operation state of the application.

The system state switching event comprises: an event of physical separation between the first system and the second system, an event of physical connection between the first system and the second system, an event of reception of a trigger by a switching element for separation between the first system and the second system, or an event of reception of a trigger by a switching element for connection between the first system and the second system.

A portable terminal is provided comprising a first system and a second system, the second system having a second control module provided therein, and the second control module comprising an obtaining unit adapted to obtain state information of the first system when at least one of the first system and the second system is in an inactive state; a receiving unit adapted to receive a system state switching event; a switching unit adapted to, based on the state information of the first system, switch the second system to a state corresponding to the state information of the first system.

When the first system is switched from an active state to an inactive state, and the second system is in an inactive state, the obtaining unit comprises at least one of: a receiving unit adapted to receive the state information of the first system transmitted from a CPU of the first system, or receive the state information of the first system transmitted from a first control module of the first system; an acquiring unit adapted to acquire the state information of the first system from the CPU or the first control module of the first system.

The switching unit comprises: a first determining unit adapted to determine that the first system is currently in the active state based on the obtained state information of the first system; a second determining unit adapted to determine that the system state switching event corresponds to a switching logic from the inactive state to the active state; and a state switching unit adapted to wake up the second system such that the second system enters the active state.

When the first system is switched from an inactive state to an active state and the second system is in the active state, the obtaining unit comprises at least one of: a receiving unit adapted to receive the state information of the first system transmitted from a first control module of the first system; and an acquiring unit adapted to acquire the state information of the first system from the first control module of the first system.

The switching unit comprises: a first determining unit adapted to determine that the first system is currently in the inactive state based on the obtained state information of the first system; a second determining unit adapted to determine that the system state switching event corresponds to a switching logic from the active state to the inactive state; and a state switching unit adapted to control the second system to enter the inactive state.

With the above solutions according to embodiments of the present invention, the portable terminal according to the present invention comprises the first system and the second system. The second system has the second control module provided therein. When at least one of the first system and the second system is in the inactive state, the second system obtains the state information of the first system through the second control module. Upon receiving a system state switching event, the second control module switches the second system to a state corresponding to the state information of the first system based on the state information of the first system. According to the embodiments of the present invention, when the system state is to be switched, it is not necessary that both systems are in the active state. Rather, the state information can be transmitted between the systems in the inactive state by a control module provided in the system, such that the power consumption of the portable terminal can be reduced. Further, the control module is only used to transmit the system information when the system is in the inactive state. The transmission of the system information can be performed rapidly since there is no need for the operating system of the system to be activated.

DETAILED DESCRIPTION

Several embodiments according to the present application will be described in the following, some of which relate to a method for switching system state and the others relate to a portable terminal. The portable terminal according to the embodiment of the present invention includes a first system and a second system. At least one of the first and second systems has a control module provided therein. The control module may be always active even when the respective system is inactive and configured to obtain the system state information of the other system.

For those skilled in the art to better understand the technical solutions according to the embodiments of the present application, the solutions will be further detailed with reference to the figures, such that the above objects, features and advantages of the present application may become more apparent.

Figure 1:
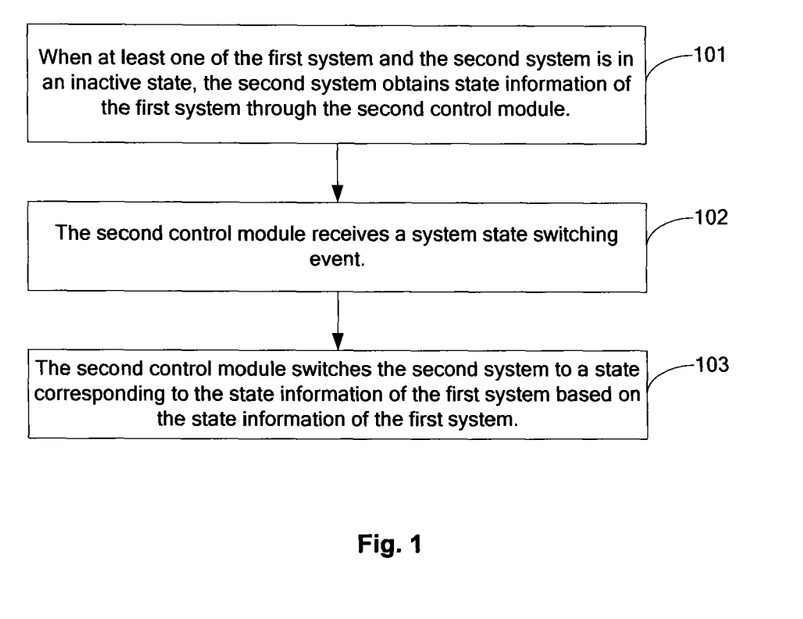
FIG. 1 is a flowchart of a method for switching system state according to the first embodiment of the present invention.

Reference is now made to FIG. 1 which is flowchart of a method for switching system state according to the first embodiment of the present invention.

At step 101, when at least one of the first system and the second system is in an inactive state, the second system obtains state information of the first system through a second control module provided in the second system.

In particular, when the first system is switched from an active state to an inactive state and the second system is in an inactive state, the second system receives through the second control module the state information of the first system transmitted from a CPU of the first system; or the second control module receives the state information of the first system transmitted from a first control module of the first system; or the second control module obtains the state information of the first system from the CPU or the first control module of the first system.

In particular, when the first system is switched from an inactive state to an active state and the second system is in an active state, the second system receives through the second control module the state information of the first system transmitted from a first control module of the first system; or the second control module obtains the state information of the first system from the first control module of the first system.

Herein, the state information comprises state information of a system or state information of an application. The state information of a system comprises sound information and/or volume information. The state information of an application comprises information on playing progress of multimedia and/or information on operation state of the application.

At step 102, the second control module receives a system state switching event.

Herein, the system state switching event comprises one of the following events: physical separation between the first system and the second system, physical connection between the first system and the second system, reception of a trigger by a switching element for separation between the first system and the second system, and reception of a trigger by a switching element for connection between the first system and the second system.

At step 103, the second control module switches the second system to a state corresponding to the state information of the first system based on the state information of the first system and the process ends.

In particular, when the first system is switched from an active state to an inactive state and the second system is in an inactive state, the second control module determines that the first system is currently in the active state based on the obtained state information of the first system. The second control module determines that the system state switching event corresponds to a switching logic from the inactive state to the active state. The second control module wakes up the second system such that the second system enters the active state and the first system enters the inactive state.

In particular, when the first system is switched from an inactive state to an active state and the second system is in an active state, the second control module determines that the first system is currently in the inactive state based on the obtained state information of the first system. The second control module determines that the system state switching event corresponds to a switching logic from the active state to the inactive state. The second control module controls the second system to enter the inactive state and the first system to enter the active state.

The method for switching system state according to the present embodiment of the present invention may be applied to a mobile terminal having hybrid systems. Such mobile terminal includes a primary system and a secondary system which share a common hardware platform. The control module in the primary system is referred to as the Embedded Controller (EC) and the control module in the secondary system is referred to as the Micro Control Unit (MCU). Each of the EC and the MCU may perform processing individually, and handle simple logic processing without the need for activating their respective operating systems. The EC and the MCU have low power consumption. When the hardware of the mobile terminal is powered on, the EC and the MCU will be in the active state, whether the primary system or the secondary system is activated or no, so as to handle system state switching. An I2C path may be provided between the EC and the MCU for transmission of system state information. When applied in a notebook computer having hybrid systems, in particular, when one of the two systems is in the inactive state, and the display screen section (where the secondary system is located) and the host section (where the primary system is located) are physically separated or connected, the system switching may be carried out based on the state information transmitted between the EC and MCU, without the need for both systems to be in a wakeup state. For clear description of the present invention, the following embodiments will be explained based on the above specific application.

Figure 2:
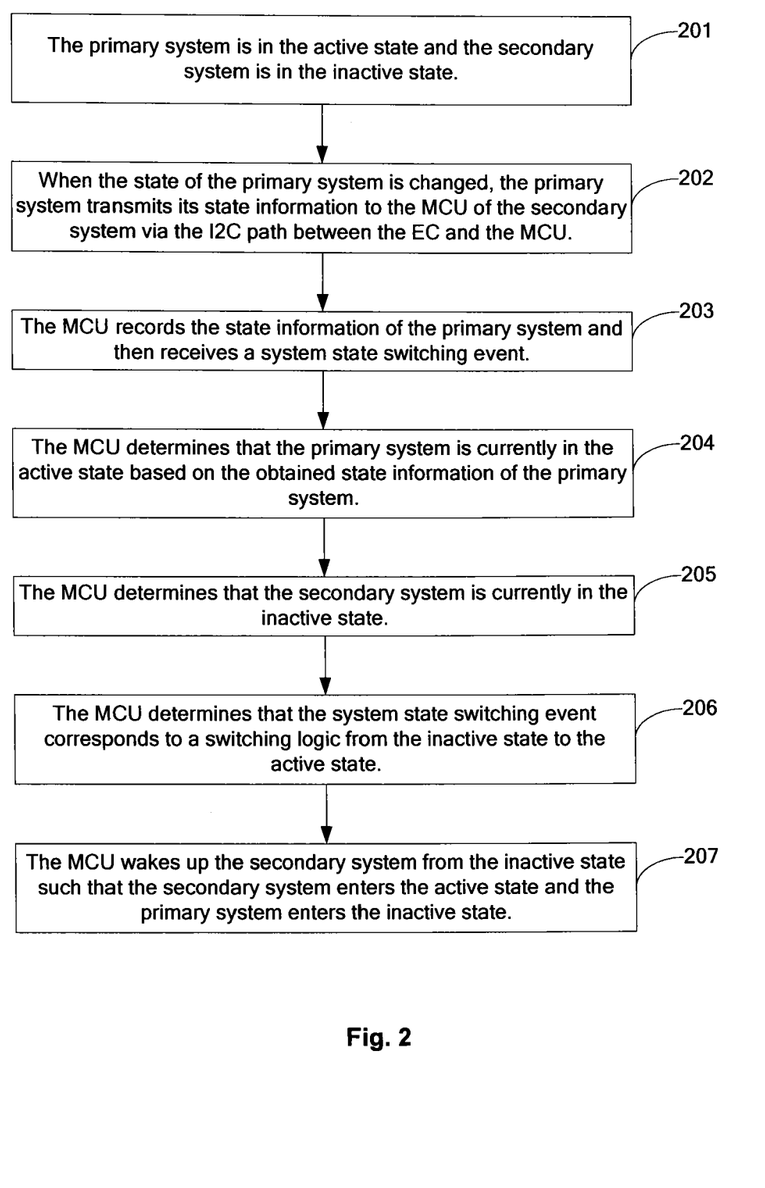
FIG. 2 is a flowchart of a method for switching system state according to the second embodiment of the present invention.

Reference is now made to FIG. 2 which is flowchart of a method for switching system state according to the second embodiment of the present invention. This embodiment shows a system state switching process in which the primary system is switched from the active state to the inactive state while the secondary system is in the inactive state.

At step 201, the primary system is in the active state and the secondary system is in the inactive state.

In particular, the inactive state may be a sleep state, a standby state or a power-off state.

At step 202, when the state of the primary system is changed, the primary system transmits its state information to the MCU of the secondary system via the I2C path between the EC and the MCU.

Here, the change in the state of the primary system means that the primary system moves from the active state to the inactive state. At this time, since the primary system is still in the active state, the CPU and EC of the primary system are both activated; while the secondary system is in the inactive state and only the MCU of the secondary system is activated. In this case, the CPU of the primary system may transmit the system state information to the EC, which may then transmit the state information of the primary system to the MCU of the secondary system via the I2C path between the EC and the MCU. Alternatively, the MCU may directly obtain the state information of the primary system from the EC.

In addition to the transmission of the state information via the I2C path between the EC and the MCU as in step 202, a path may be established between the MCU and the CPU of the primary system, on which path the CPU of the primary system may transmit the state information to the MCU directly or the MCU may directly obtain the state information from the CPU of the primary system.

At step 203, the MCU records the state information of the primary system and then receives a system state switching event.

In particular, the system state switching event may be an event of physical separation between the primary system and the secondary system, an event of physical connection between the primary system and the secondary system, an event of reception of a trigger by a switching element for separation between the primary system and the secondary system, or an event of reception of a trigger by a switching element for connection between the primary system and the secondary system.

At step 204, the MCU determines that the primary system is currently in the active state based on the obtained state information of the primary system.

At step 205, the MCU determines that the secondary system is currently in the inactive state.

At step 206, the MCU determines that the system state switching event corresponds to a switching logic from the inactive state to the active state.

At step 207, the MCU wakes up the secondary system from the inactive state such that the secondary system enters the active state and the primary system enters the inactive state. The process ends.

Figure 3:
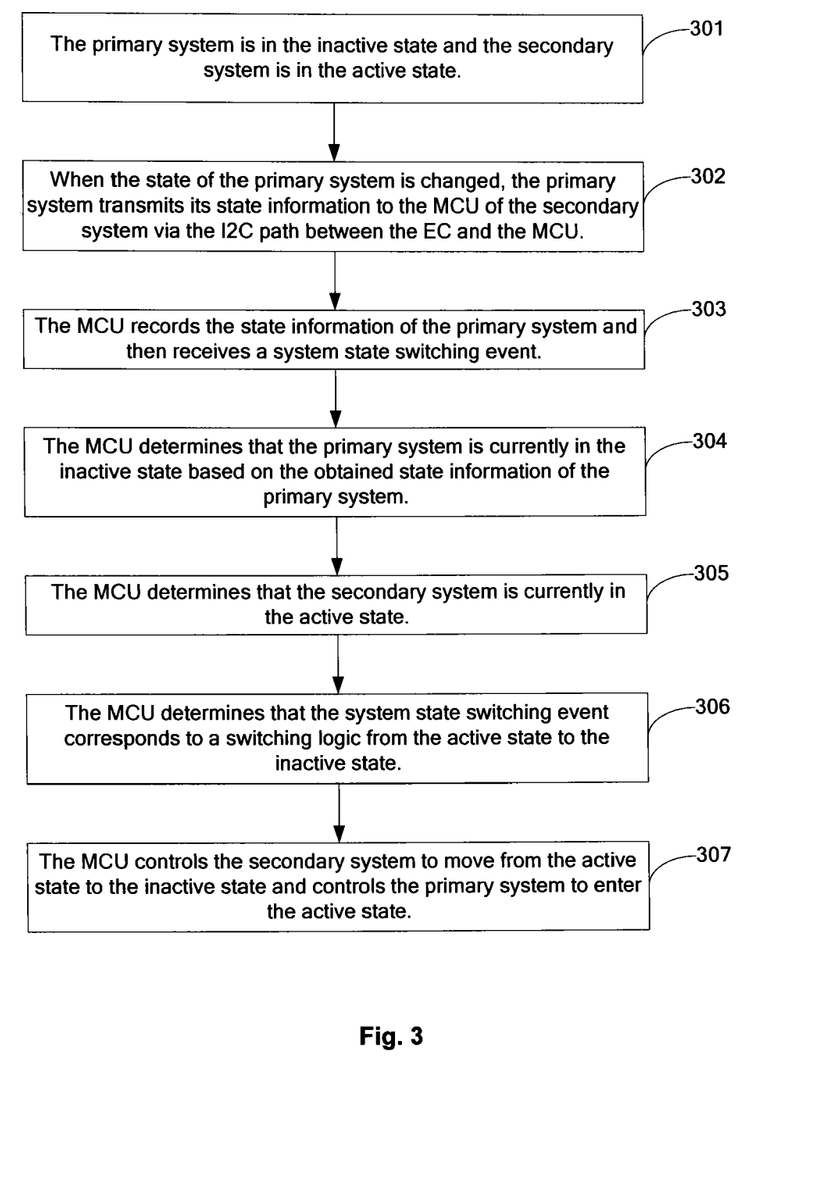
FIG. 3 is a flowchart of a method for switching system state according to the third embodiment of the present invention.

Reference is now made to FIG. 3 which is flowchart of a method for switching system state according to the third embodiment of the present invention. This embodiment shows a system state switching process in which the primary system is switched from the inactive state to the active state while the secondary system is in the active state.

At step 301, the primary system is in the inactive state and the secondary system is in the active state.

At step 302, when the state of the primary system is to be changed, the primary system transmits its state information to the MCU of the secondary system via the I2C path between the EC and the MCU.

Here, the change in the state of the primary system means that the primary system moves from the inactive state to the active state. At this time, since the primary system is in the inactive state, only the EC of the primary system is activated; while the secondary system is in the active state and the CPU and the MCU of the secondary system are both activated. In this case, the EC of the primary system may transmit the state information of the primary system to the MCU of the secondary system via the I2C path between the EC and the MCU. Alternatively, the MCU may directly obtain the state information of the primary system from the EC.

In addition to the transmission of the state information via the I2C path between the EC and the MCU as in step 302, a path may be established between the EC and the CPU of the secondary system, on which path the EC of the primary system may transmit the state information to the CPU of the secondary system directly or the CPU of the secondary system may directly obtain the state information from the EC of the primary system.

At step 303, the MCU records the state information of the primary system and then receives a system state switching event.

At step 304, the MCU determines that the primary system is currently in the inactive state based on the obtained state information of the primary system.

At step 305, the MCU determines that the secondary system is currently in the active state.

At step 306, the MCU determines that the system state switching event corresponds to a switching logic from the active state to the inactive state.

At step 307, the MCU controls the secondary system to move from the active state to the inactive state and controls the primary system to enter the active state. The process ends.

Figure 4:
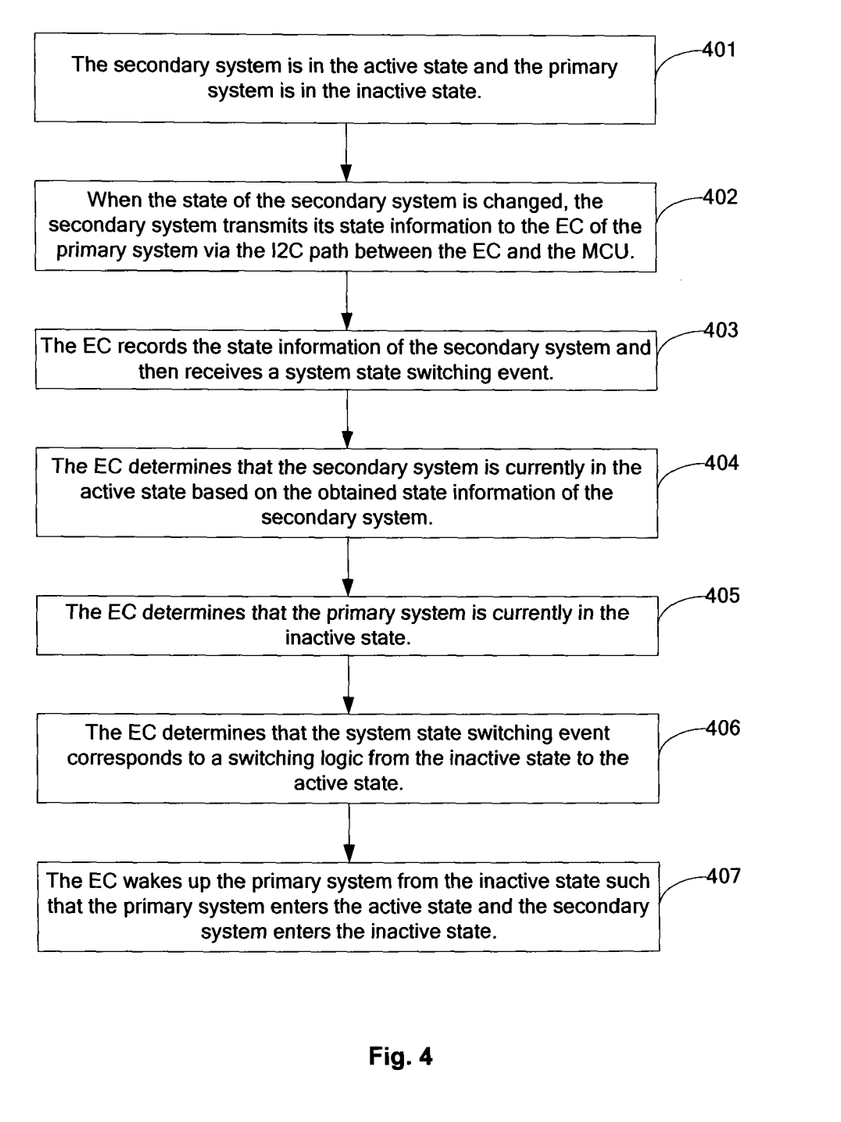
FIG. 4 is a flowchart of a method for switching system state according to the fourth embodiment of the present invention.

Reference is now made to FIG. 4 which is flowchart of a method for switching system state according to the fourth embodiment of the present invention. This embodiment shows a system state switching process in which the secondary system is switched from the active state to the inactive state while the primary system is in the inactive state.

At step 401, the secondary system is in the active state and the primary system is in the inactive state.

At step 402, when the state of the secondary system is to be changed, the secondary system transmits its state information to the EC of the primary system via the I2C path between the EC and the MCU.

Here, the change in the state of the secondary system means that the secondary system moves from the active state to the inactive state. At this time, since the secondary system is in the active state, the CPU and the MCU of the secondary system are both activated; while the primary system is in the inactive state and only the EC of the primary system is activated. In this case, the CPU of the secondary system may transmit the state information of the secondary system to the MCU, which may then transmit the state information of the secondary system to the EC of the primary system via the I2C path between the EC and the MCU. Alternatively, the EC may directly obtain the state information of the secondary system from the MCU.

In addition to the transmission of the state information via the I2C path between the EC and the MCU as in step 402, a path may be established between the EC and the CPU of the secondary system, on which path the CPU of the primary system may transmit the state information to the EC directly or the EC may directly obtain the state information from the CPU of the secondary system.

At step 403, the EC records the state information of the secondary system and then receives a system state switching event.

At step 404, the EC determines that the secondary system is currently in the active state based on the obtained state information of the secondary system.

At step 405, the EC determines that the primary system is currently in the inactive state.

At step 406, the EC determines that the system state switching event corresponds to a switching logic from the inactive state to the active state.

At step 407, the EC wakes up the primary system from the inactive state such that the primary system enters the active state and the secondary system enters the inactive state. The process ends.

Figure 5:
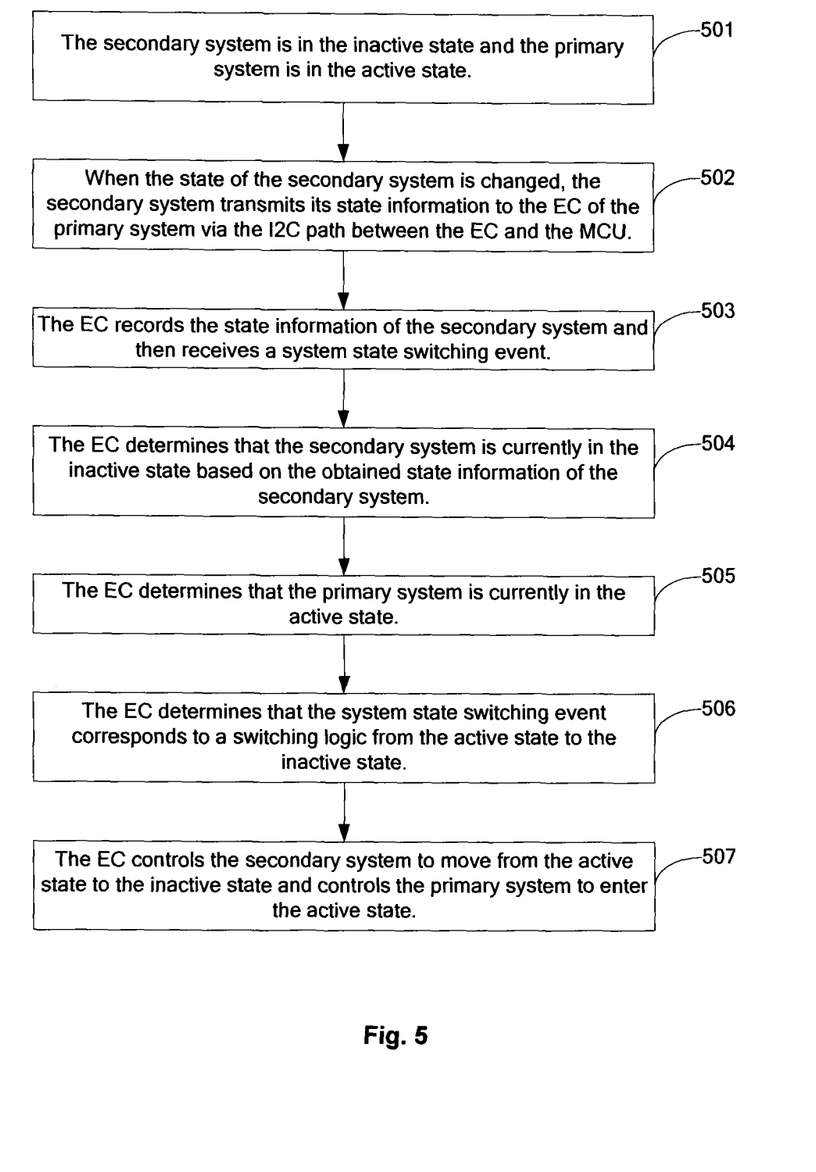
FIG. 5 is a flowchart of a method for switching system state according to the fifth embodiment of the present invention.

Reference is now made to FIG. 5 which is a flowchart of a method for switching system state according to the fifth embodiment of the present invention. This embodiment shows a system state switching process in which the secondary system is switched from the inactive state to the active state while the primary system is in the active state.

At step 501, the secondary system is in the inactive state and the primary system is in the active state.

At step 502, when the state of the secondary system is to be changed, the secondary system transmits its state information to the EC of the primary system via the I2C path between the EC and the MCU.

Here, the change in the state of the secondary system means that the secondary system moves from the inactive state to the active state. At this time, since the secondary system is in the inactive state, only the MCU of the secondary system is activated; while the primary system is in the active state and the CPU and the EC of the primary system are both activated. In this case, the MCU of the secondary system may transmit the state information of the secondary system to the EC of the primary system via the I2C path between the EC and the MCU. Alternatively, the EC may directly obtain the state information of the secondary system from the MCU.

In addition to the transmission of the state information via the I2C path between the EC and the MCU as in step 502, a path may be established between the MCU and the CPU of the primary system, on which path the MCU of the secondary system may transmits the state information to the CPU of the primary system directly or the CPU of the primary system may directly obtain the state information from the MCU of the secondary system.

At step 503, the EC records the state information of the secondary system and then receives a system state switching event.

At step 504, the EC determines that the secondary system is currently in the inactive state based on the obtained state information of the secondary system.

At step 505, the EC determines that the primary system is currently in the active state.

At step 506, the EC determines that the system state switching event corresponds to a switching logic from the active state to the inactive state.

At step 507, the EC controls the secondary system to move from the active state to the inactive state and controls the primary system to enter the active state. The process ends.

Corresponding to the method for switching system state according to the embodiments of the present invention, a portable terminal is also provided according to an embodiment of the present invention.

Figure 6:
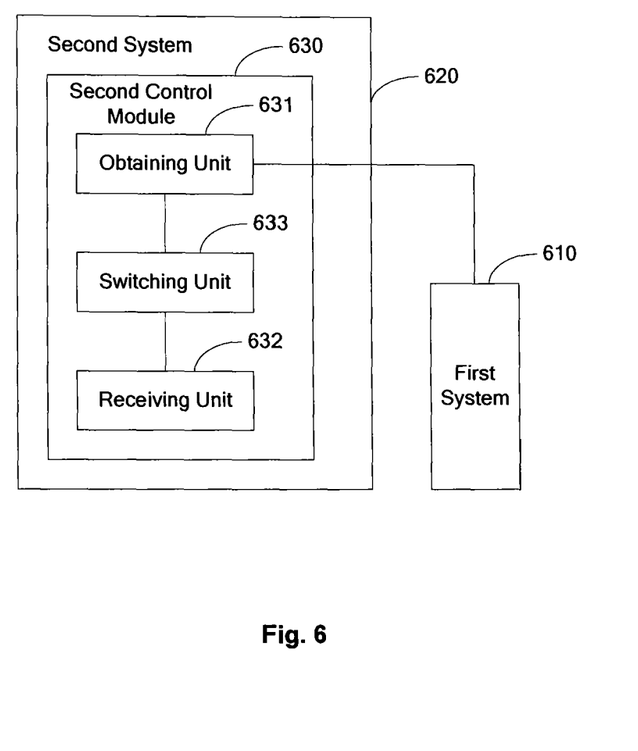
FIG. 6 is a block diagram of a portable terminal according to an embodiment of the present invention.

Reference is now made to FIG. 6, which is a block diagram of a portable terminal according to an embodiment of the present invention.

The portable terminal has a first system 610 and a second system 620. The second system 620 has a second control module 630 provided therein. The second control module 630 includes: an obtaining unit 631 adapted to obtain state information of the first system 610 when at least one of the first system 610 and the second system 620 is in an inactive state; a receiving unit 632 adapted to receive a system state switching event; a switching unit 633 adapted to switch the second system 620 to a state corresponding to the state information of the first system 610 based on the state information of the first system 610.

In particular, when the first system 610 is switched from an active state to an inactive state and the second system 620 is in the inactive state, the obtaining unit 631 may include at least one of (not shown in FIG. 6) a receiving unit adapted to receive the state information of the first system 610 transmitted from a CPU of the first system 610 or receive the state information of the first system 610 transmitted from a first control module of the first system 610, and an acquiring unit adapted to acquire the state information of the first system 610 from the CPU or the first control module of the first system 610.

Accordingly, the switching unit 633 may include (not shown in FIG. 6) a first determining unit adapted to determine that the first system 610 is currently in the active state based on the obtained state information of the first system 610, a second determining unit adapted to determine that the system state switching event corresponds to a switching logic from the inactive state to the active state, and a state switching unit adapted to wake up the second system 620 such that the second system 620 enters the active state.

In particular, when the first system 610 is switched from an inactive state to an active state and the second system 620 is in the active state, the obtaining unit 631 may include at least one of (not shown in FIG. 6) a receiving unit adapted to receive the state information of the first system 610 transmitted from a first control module of the first system 610, and an acquiring unit adapted to acquire the state information of the first system 610 from the first control module of the first system 610.

Accordingly, the switching unit 633 may include (not shown in FIG. 6), a first determining unit adapted to determine that the first system 610 is currently in the inactive state based on the obtained state information of the first system 610, a second determining unit adapted to determine that the system state switching event corresponds to a switching logic from the active state to the inactive state, and a state switching unit adapted to control the second system 620 to enter the inactive state.

With the above solutions according to the embodiments of the present invention, the portable terminal according to the present invention comprises the first system and the second system. The second system has the second control module provided therein. When at least one of the first system and the second system is in the inactive state, the second system obtains the state information of the first system through the second control module. Upon receiving a system state switching event, the second control module switches the second system to a state corresponding to the state information of the first system based on the state information of the first system. According to the embodiments of the present invention, when the system state is to be switched, it is not necessary that both systems are in the active state. Rather, the state information can be transmitted between the systems in the inactive state by a control module provided in the system, such that the power consumption of the portable terminal can be reduced. Further, the control module is only used to transmit the system information when the system is in the inactive state. The transmission of the system information can be performed rapidly since there is no need for the operating system of the system to be activated.

It can be appreciated by those skilled in the art that the techniques according to the embodiments of the present application can be implemented in software in combination with a necessary general purpose hardware platform. In view of this, the technical solutions according to the embodiments of the present application, or in other words a part thereof which makes contribution over the prior art, can be substantially embodied in a form of software product. The computer software product can be stored in a storage media, such as ROM/RAM, magnetic disk, optical disc and the like, containing instructions which cause a computer device (which can be a personal computer, a server, a network device or the like) to perform one or more methods according to the embodiments of the present application or particular parts thereof.

The embodiments in the specification are described in a progressive manner. The same or similar elements of the respective embodiments may refer to each other. The description of any embodiment focuses on the difference compared with other embodiments. The embodiments of the devices and terminals and the embodiments of the corresponding method may refer to each other, so as to omit the duplicated description.

The embodiments of the present application as described above do not limit the scope of the present application which should encompass all variations, equivalents and modifications that fall within the principle and spirit of the present application.

What is claimed is:

1. A method for switching system state in a portable terminal,
the portable terminal comprising a first control device provided for a first system and a second control device provided for a second system, the first control device is a hardware control device different from a CPU of the first system and able to operate when the first system is in an inactive state, and the second control device is a hardware control device different from a CPU of the second system and able to operate when the second system is in an inactive state, a physical communication path is provided between the first and second control devices for communicating state information of the first and second systems,
the method comprising:
obtaining, by the second control device, state information of the first system, when at least one of the first system and the second system is in an inactive state, wherein the state information indicates whether the first system is currently in the active or inactive state;
receiving, by the second control device, a system state switching event;
switching, by the second control device based on the state information of the first system, the second system to a state corresponding to the state information of the first system.

2. The method of claim 1, wherein when the first system is to be switched from an active state to an inactive state, and the second system is in an inactive state, said step of obtaining, by the second control device, state information of the first system through the communication path comprises:
the second control device receiving, through a further physical communication path between the second control device and the CPU of the first system, the state information of the first system transmitted from a CPU of the first system; or
the second control device receiving through the communication path, the state information of the first system transmitted from the first control device of the first system; or
the second control device acquiring the state information of the first system from the CPU or the first control device of the first system.

3. The method of claim 2, wherein said step of switching, by the second control device based on the state information of the first system, the second system to a state corresponding to the state information of the first system comprises:

the second control device determining that the first system is currently in the active state based on the obtained state information of the first system;

the second control device determining that the system state switching event corresponds to a switching logic from the inactive state to the active state; and the second control device waking up the second system such that the second system enters the active state and the first system enters the inactive state.

4. The method of claim 1, wherein when the first system is to be switched from an inactive state to an active state and the second system is in an active state, said step of obtaining, by the second control device, state information of the first system comprises:

the second control device receiving through the communication path, the state information of the first system transmitted from the first control device of the first system; or the second control device acquiring the state information of the first system from the first control device of the first system.

5. The method of claim 4, wherein said step of switching, by the second control device based on the state information of the first system, the second system to a state corresponding to the state information of the first system comprises:

the second control device determining that the first system is currently in the inactive state based on the obtained state information of the first system;

the second control device determining that the system state switching event corresponds to a switching logic from the active state to the inactive state; and the second control device controlling the second system to enter the inactive state and controlling the first system to enter the active state.

6. The method of claim 1, wherein
the state information comprises state information of a system or state information of an application,
the state information of a system comprises sound information, and/or volume information; and
the state information of an application comprises information on playing progress of multimedia, and/or information on the operation state of the application.

7. The method of claim 1, wherein the system state switching event comprises:
an event of physical separation between the first system and the second system, an event of physical connection between the first system and the second system, an event of reception of a trigger by a switching element for separation between the first system and the second system, or an event of reception of a trigger by a switching element for connection between the first system and the second system.

8. A portable terminal comprising a first control device provided for a first system and a second control device provided for a second system, the first control device is a hardware control device different from a CPU of the first system and able to operate when the first system is in an inactive state, and the second control device is a hardware control device different from a CPU of the second system and able to operate when the second system is in an inactive state, a physical communication path is provided between the first and second control devices for communicating state information of the first and second systems, the second control device is programmed to:
obtain state information of the first system when at least one of the first system and the second system is in an inactive state, wherein the state information indicates whether the first system is currently in the active or inactive state;

receive a system state switching event;

based on the state information of the first system, switch the second system to a state corresponding to the state information of the first system.

9. The portable terminal of claim 8, wherein when the first system is to be switched from an active state to an inactive state, and the second system is in an inactive state, the second control device obtains the state information of the first system by at least one of:

receiving, through a further physical communication path between the second control device and the CPU of the first system, the state information of the first system transmitted from the CPU of the first system, or, receiving, through the communication path, the state information of the first system transmitted from a first control device of the first system; or acquiring the state information of the first system from the CPU or the first control device of the first system.

10. The portable terminal of claim 9, wherein the second control device switches the second system to the state corresponding to the state information of the first system by:

determining that the first system is currently in the active state based on the obtained state information of the first system;

determining that the system state switching event corresponds to a switching logic from the inactive state to the active state; and waking up the second system such that the second system enters the active state.

11. The portable terminal of claim 8, wherein when the first system is to be switched from an inactive state to an active state and the second system is in the active state, the second control device obtains the state information of the first system by at least one of:

receiving, through the communication path, the state information of the first system transmitted from the first control device of the first system; or acquiring the state information of the first system from the first control device of the first system.

12. The portable terminal of claim 11, wherein the second control device switches the second system to the state corresponding to the state information of the first system by:

determining that the first system is currently in the inactive state based on the obtained state information of the first system;

determining that the system state switching event corresponds to a switching logic from the active state to the inactive state; and controlling the second system to enter the inactive state.

13. The method of claim 1, wherein the first system is a master system, and the second system is a secondary system,
the first control device comprises an Embedded Controller (EC), and the second control device comprises a Micro Control Unit (MCU).

14. The portable terminal of claim 8, wherein the first system is a master system, and the second system is a secondary system,
the first control device comprises an Embedded Controller (EC), and the second control device comprises a Micro Control Unit (MCU).

15. A method for switching system state in a portable terminal, the portable terminal comprising a first control device provided for a first system and a second control device provided for a second system, the first control device is a first hardware control device different from a CPU of the first system and able to operate when the first system is in an inactive state, and the second control module is a second hardware control device different from a CPU of the second system and able to operate when the second system is in an inactive state, a physical communication path is provided between the first and second control devices for communicating state information of the first and second systems, the method comprising:

obtaining, by the first control device, state information of the second system, when at least one of the first system and the second system is in an inactive state, when the state information indicates whether the first system is currently in the active or inactive state;

receiving, by the first control device, a system state switching event;

switching, by the first control device based on the state information of the second system, the first system to a state corresponding to the state information of the second system.

16. The method of claim 15, wherein when the second system is to be switched from an active state to an inactive state, and the first system is in an inactive state, said step of obtaining, by the first control device through the communication path, state information of the second system comprises:

the first control device receiving, through the communication path, the state information of the second system transmitted from the second control device of the second system; or the first control device acquiring the state information of the second system from the second control device of the second system; and said step of switching, by the first control device based on the state information of the second system, the first system to a state corresponding to the state information of the second system comprises:

the first control device determining that the second system is currently in the active state based on the obtained state information of the second system;

the first control device determining that the system state switching event corresponds to a switching logic from the inactive state to the active state; and the first control device waking up the first system such that the first system enters the active state and the second system enters the inactive state.

17. The method of claim 15, wherein when the second system is to be switched from an inactive state to an active state and the first system is in an active state, said step of obtaining, by the first control device through the communication path, state information of the second system comprises:

the first control device receiving, through the communication path, the state information of the second system transmitted from the second control device of the second system; or the first control device acquiring the state information of the second system from the second control device of the second system; and said step of switching, by the first control device based on the state information of the second system, the first system to a state corresponding to the state information of the second system comprises:

the first control device determining that the second system is currently in the inactive state based on the obtained state information of the second system;

the first control device determining that the system state switching event corresponds to a switching logic from the active state to the inactive state; and the first control device controlling the first system to enter the inactive state and controlling the second system to enter the active state.

18. A portable terminal comprising a first control device provided for a first system and a second control device provided for a second system, the first control device is a hardware control device different from a CPU of the first system and able to operate when the first system is in an inactive state, and the second control device is a hardware control device different from a CPU of the second system and able to operate when the second system is in an inactive state, a physical communication path is provided between the first and second control devices for communicating state information of the first and second systems, the first control device is programmed to:

obtain state information of the second system when at least one of the first system and the second system is in an inactive state, wherein the state information indicates whether the first system is currently in the active or inactive state;

receive a system state switching event;

based on the state information of the second system, switch the first system to a state corresponding to the state information of the second system.

19. The portable terminal of claim 18, wherein when the second system is to be switched from an active state to an inactive state, and the first system is in an inactive state, the first control device obtains the state information of the first system by at least one of:

receiving, through the communication path, the state information of the second system transmitted from the second control device of the second system; or acquiring the state information of the second system from the second control device of the second system; and the first control device switches the first system to the state corresponding to the state information of the second system by:

determining that the second system is currently in the active state based on the obtained state information of the second system;

determining that the system state switching event corresponds to a switching logic from the inactive state to the active state; and waking up the first system such that the first system enters the active state.

20. The portable terminal of claim 18, wherein when the second system is to be switched from an inactive state to an active state and the first system is in the active state, the first control device obtains the state information of the second system by at least one of:

receiving, through the communication path, the state information of the second system transmitted from the second control device of the second system; or acquiring the state information of the second system from the second control device of the second system; and the first control device switches the first system to the state corresponding to the state information of the second system by:

determining that the second system is currently in the inactive state based on the obtained state information of the second system;

determining that the system state switching event corresponds to a switching logic from the active state to the inactive state; and controlling the first system to enter the inactive state.

* * * * *